(12) United States Patent
Ehlers (10) Patent No.: US 10,420,292 B1
(45) Date of Patent: Sep. 24, 2019

(54) WOOD LOG HOLDING DEVICE

(71) Applicant: Tim J Ehlers, Green Bay, WI (US)

(72) Inventor: Tim J Ehlers, Green Bay, WI (US)

(*) Notice: Subject to any disclaimer, the term of this patent is extended or adjusted under 35 U.S.C. 154(b) by 0 days.

(21) Appl. No.: 16/025,509

(22) Filed: Jul. 2, 2018

(51) Int. Cl.
*A01G 23/099* (2006.01)
*B60R 9/06* (2006.01)
*F16M 13/02* (2006.01)

(52) U.S. Cl.
CPC .............. *A01G 23/099* (2013.01); *B60R 9/06* (2013.01); *F16M 13/022* (2013.01); *F16M 2200/06* (2013.01)

(58) Field of Classification Search
CPC .............. A01G 23/099; F16M 13/022; F16M 2200/06; B60R 9/06; F17C 13/084; F17C 2201/0104; F17C 2201/032; B62B 1/264; B62B 2202/022; B62B 2203/44
USPC .... 296/91, 99, 100, 902; 248/126, 132, 161, 248/157
See application file for complete search history.

(56) References Cited

U.S. PATENT DOCUMENTS

| | | | | |
|---|---|---|---|---|
| 5,820,455 A | * | 10/1998 | Breedlove | ................ A22B 5/06 452/187 |
| 5,848,666 A | * | 12/1998 | Woodall | ................ A01M 31/02 182/187 |
| 7,341,507 B1 | * | 3/2008 | Julian, Sr. | ................ A22B 5/06 452/192 |
| D625,386 S | * | 10/2010 | Missildine | ................... D22/199 |
| 9,707,665 B1 | * | 7/2017 | Smith | ................ B25B 1/02 |
| 2019/0106062 A1 | * | 4/2019 | Olsen | ................ B60R 9/06 |

* cited by examiner

*Primary Examiner* — Muhammad Ijaz
(74) *Attorney, Agent, or Firm* — Steven H Greenfield; "Greenfield Invention and Patent Consulting, Inc."

(57) ABSTRACT

A device for holding a wood log in place in such a way that a person can cut the log with a saw or split it with an axe is disclosed. The device can be attached to trees or vehicles to keep it in place and can be assembled and disassembled with relative ease. The device is configured to hold the logs between two support arms attached to a post and a grip member attached to each of the support arms. The post is configured for attaching to standing trees through extending arms or brackets and configured for position adjustments by way of sliding inside sleeves that attach to the post, bracket or a hitch of a vehicle.

15 Claims, 9 Drawing Sheets

WOOD LOG HOLDING DEVICE

FIELD OF THE INVENTION

The present invention relates to a device for holding a wood log in place in such a way that a person can cut the log with a saw or split it with an axe. The device can be attached to posts or trees to keep it in place and can be assembled and disassembled with relative ease.

BACKGROUND OF THE INVENTION

Cutting tree trunks into individual logs is done frequently for various reasons and purposes. For example, trees may be need to be cut down due to disease or clearing a dense wooded area and the trunks cut into smaller pieces for disposal or for use as firewood. Cutting of the trees and trunks is typically done using saws or splitting with axes. This activity is difficult to carry out in a wooded area due to lack of space and the size of the equipment needed for holding the trunks. Furthermore, the current practice of cutting up the tree trunks into shorter pieces using a chainsaw when they lay on the ground requires the user to bend down for long periods of time and may result in wear and tear on the chainsaw when it inadvertently comes in contact with hard objects on the ground. The present invention solves the problem by providing a device that can be attached to another tree or a vehicle, requires relatively little space, can be assembled and disassembled with relative ease, and is configured to move in and out of the wooded area with relative ease.

SUMMARY OF THE PRESENT INVENTION

In one aspect of the present invention, a wood log holding device comprises a first vertical post disposed on a ground; an upper support arm attached to the first vertical post; the upper support arm being adapted for upward and downward sliding, the upper support arm being positioned substantially perpendicular with the first vertical post; a lower support arm attached to the first vertical post, the lower support arm being positioned below the upper support arm, the lower support arm being positioned substantially perpendicular with the first vertical post; at least two downwardly disposed grip members attached to a rear side of the upper support arm; and at least two upwardly disposed grip members attached to a front side of the lower support arm.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

It is the object of the present invention to provide a device for holding wood logs in position that allows sawing off portions using a saw or splitting portions using an axe. The device is configured for carrying into and setting up in wooded areas and for a relatively easy assembly and disassembly.

FIGS. 1-11 describe several embodiments of the present invention. In a first embodiment presented in FIGS. 1-3, the device comprises a post 11 and two support arms: an upper support arm 12 and a lower support arm 16 disposed perpendicularly to the post 11. The lower support arm 16 is substantially parallel with the upper support arm 12; however it is longer and extends further out of the post 11 than the upper support arm 12. The upper support arm 12 contains two grip members 13A and 13B that are attached to the upper support arm 12 and are substantially perpendicular to the upper support arm 12. The grip members 13A and 13B are disposed at about 90 degrees relative to each other; however, other angles of separation are also within the scope of the present invention.

Figure 1:
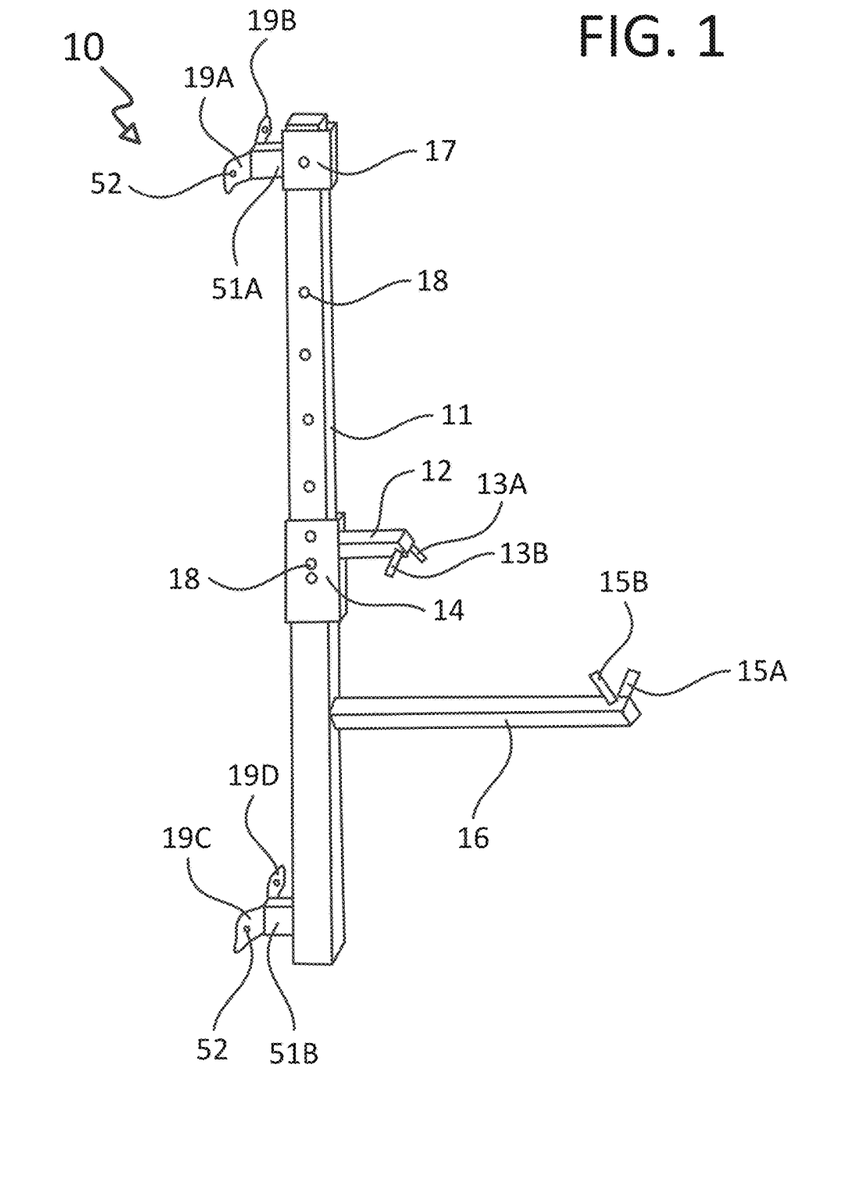
FIG. 1 shows a perspective side view of a wood log holding device according to a first embodiment of the present invention.
Figures 2, 3:
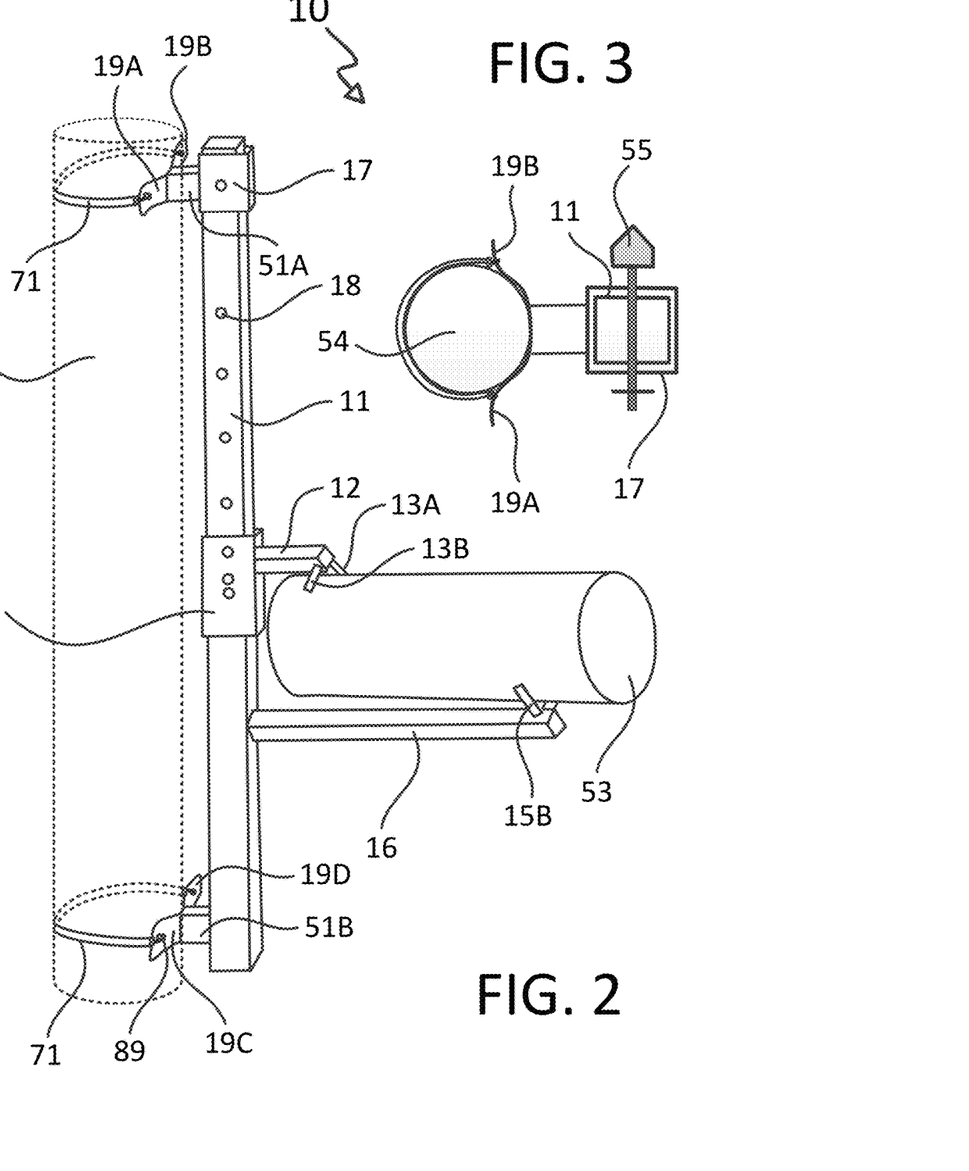
FIG. 2 depicts a perspective side view of a wood log holding device in a use configuration according to a first embodiment of the present invention.
FIG. 3 shows a top view of a wood log holding device in a use configuration according to a first embodiment of the present invention.

The back of the upper support arm 12 is attached to a sleeve 14 adapted for sliding up and down on post 11. This allows adjusting the grip over different size logs. The sleeve 14 maybe fixed in a desired position by inserting an eyelet pin 56 through one of the holes 18. Both the sleeve 14 and post 11 contain a plurality of such holes to provide ample location options for placing the sleeve 14 in a fixed position.

The lower support arm 16 also contains two grip members 15A and 15B that are attached to the lower support arm 16 and are perpendicular relative to the lower support arm 16. A wood log 53 is positioned such that the forward portion is placed onto the onto grip members 15A and 15B that are attached to the lower support arm 16, while the rear portion of the log is supported by grip members 13A and 13B that are attached to the upper support arm 12. It is noted that the log 53 may extend a significant length beyond grip members 15A and 15B.

In the first embodiment 10, the attachment to a tree 54 is done through two sets of attaching arms: an upper set and a lower set. The upper set of attaching arms consists of tree attaching arms 19A and 19B that are attached to upper tree connecting arm 51A which in turn is attached to sleeve 17 adapted for sliding up and down the post 11 to adjust the position of tree attaching arms 19A and 19B relative to the tree. The sleeve 17 is kept in the desired position by affixing it to the post 11 using pin 55.

The lower set consists of tree attaching arms 19C and 19D attached to lower tree connecting arm 51B that is directly attached to a lower portion of post 11. It is noted that attaching the lower tree connecting arm 51B to the post may also be optionally done through a sleeve adapted for sliding up and down the post 11 which would provide added options for locating the attachment to a tree.

The upper set is attached to an upper portion of the tree 54. The attachment to the upper portion of the tree is accomplished through a flexible strap 71 that contains two hooks 89 that are attached to each side of the strap 71. The hooks 89 are inserted into holes 52 disposed in each of the tree attaching arms 19A and 19B. The lower set is attached to a lower portion of the tree 54. The attachment to the lower portion of the tree is likewise accomplished through a flexible strap 71 that contains two hooks 89 attached to each side of the strap 71. The hooks 89 are inserted into holes 52 disposed in each of the tree attaching arms 19C and 19D in a way that fastens the device to the tree.

Figures 4, 5:
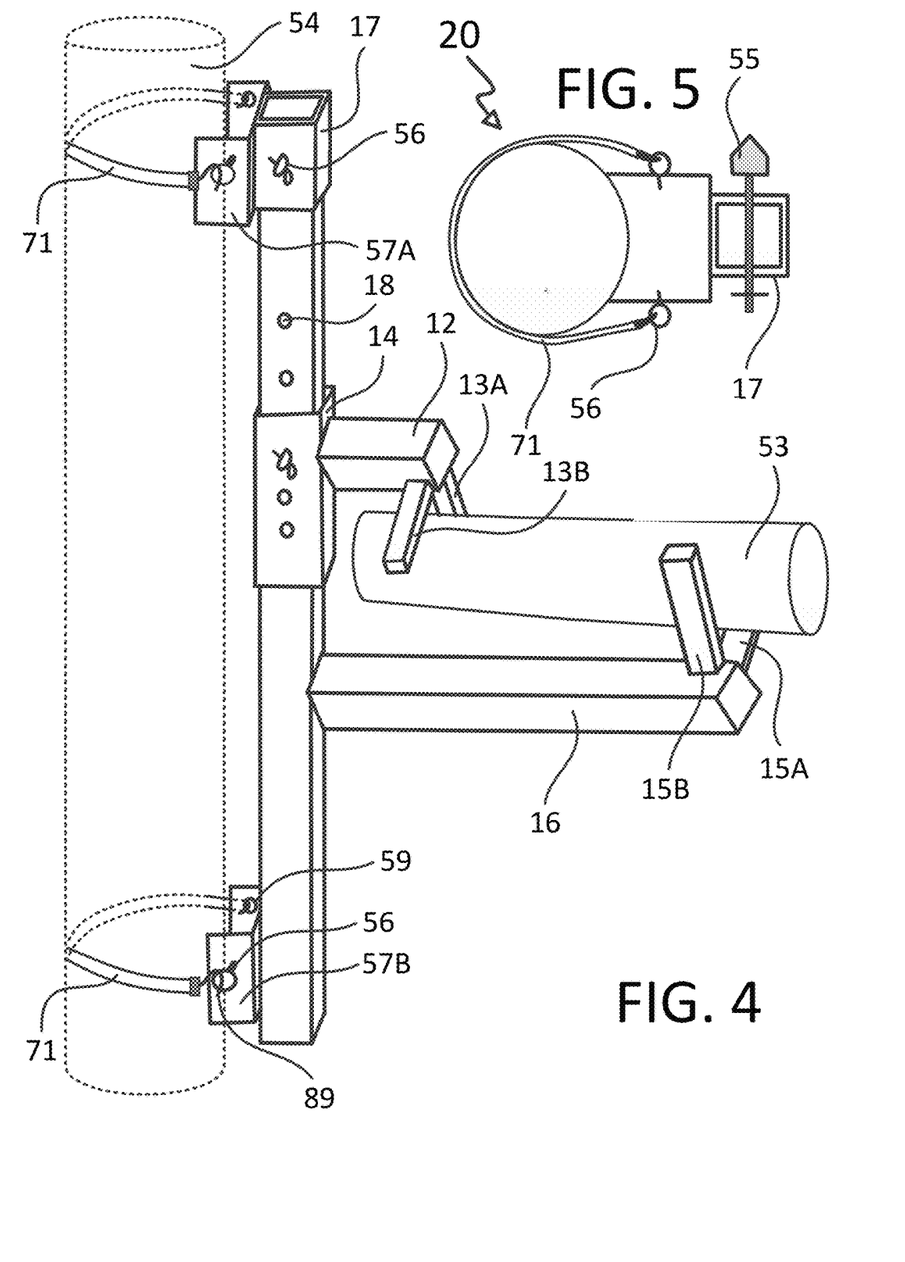
FIG. 4 shows a side perspective view of a wood log holding device in a use configuration according to a second embodiment of the present invention.
FIG. 5 shows a top view of a wood log holding device in a use configuration according to a second embodiment of the present invention.
Figure 6:
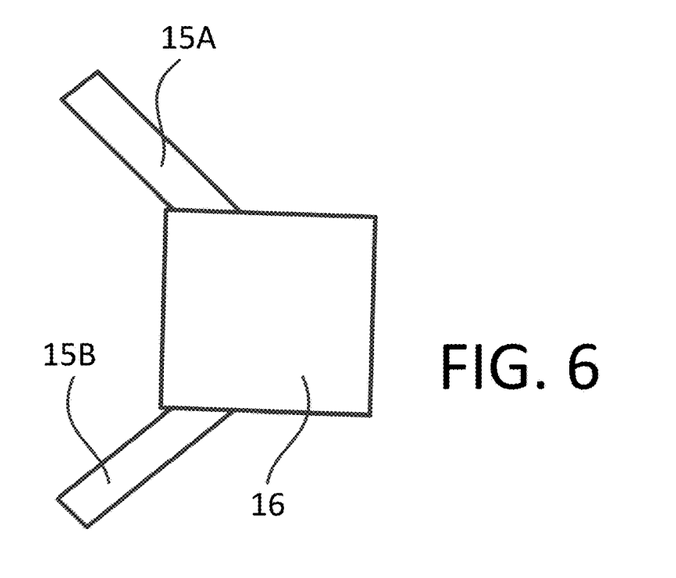
FIGS. 6-7 are components of the wood log holding device according to a first and second embodiment of the present invention.

In the second embodiment of the present invention, an upper tree support bracket 57A and a lower support bracket 57B are used for attaching to the tree 54. This is accomplished by using a strap 71 to fasten the upper support bracket 57A to the upper portion of the tree 54 and a strap 71 to fasten the lower support bracket 57B to the upper portion of the tree 54. Each strap 71 has a hook attached to each end that hook onto an eyelet pin 56 inserted into holes 59 disposed on each side of each bracket 57A and 57B.

Figure 7:
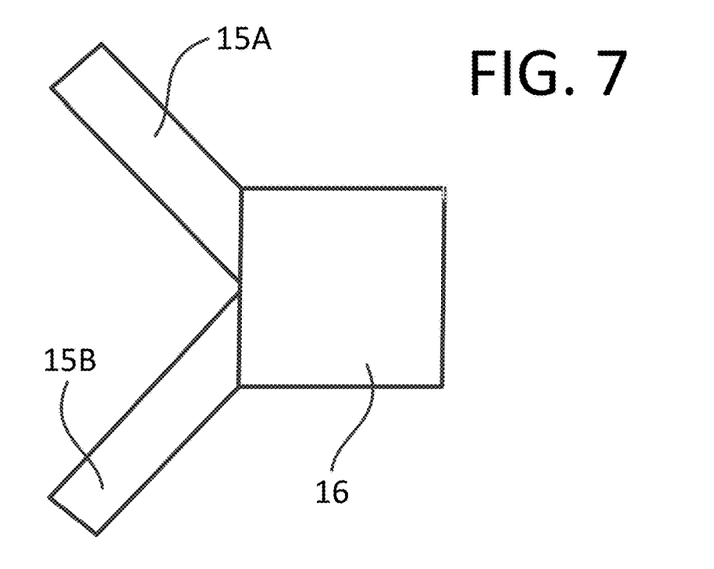

FIG. 7 shows two configurations for spacing grip members 15A and 15B attached to the lower support arm 16. The grip members 15A and 15B may be spaced in various configurations in order to allow accommodating different size logs 53. The surfaces of the upper support arm grip members 15A and 15B and the surfaces of the upper support arm grip members 13A and 13B that come in contact with the log 53 may contain spikes 74 that reinforce the grip on the log 53 and help keep it immobile.

Figure 8:
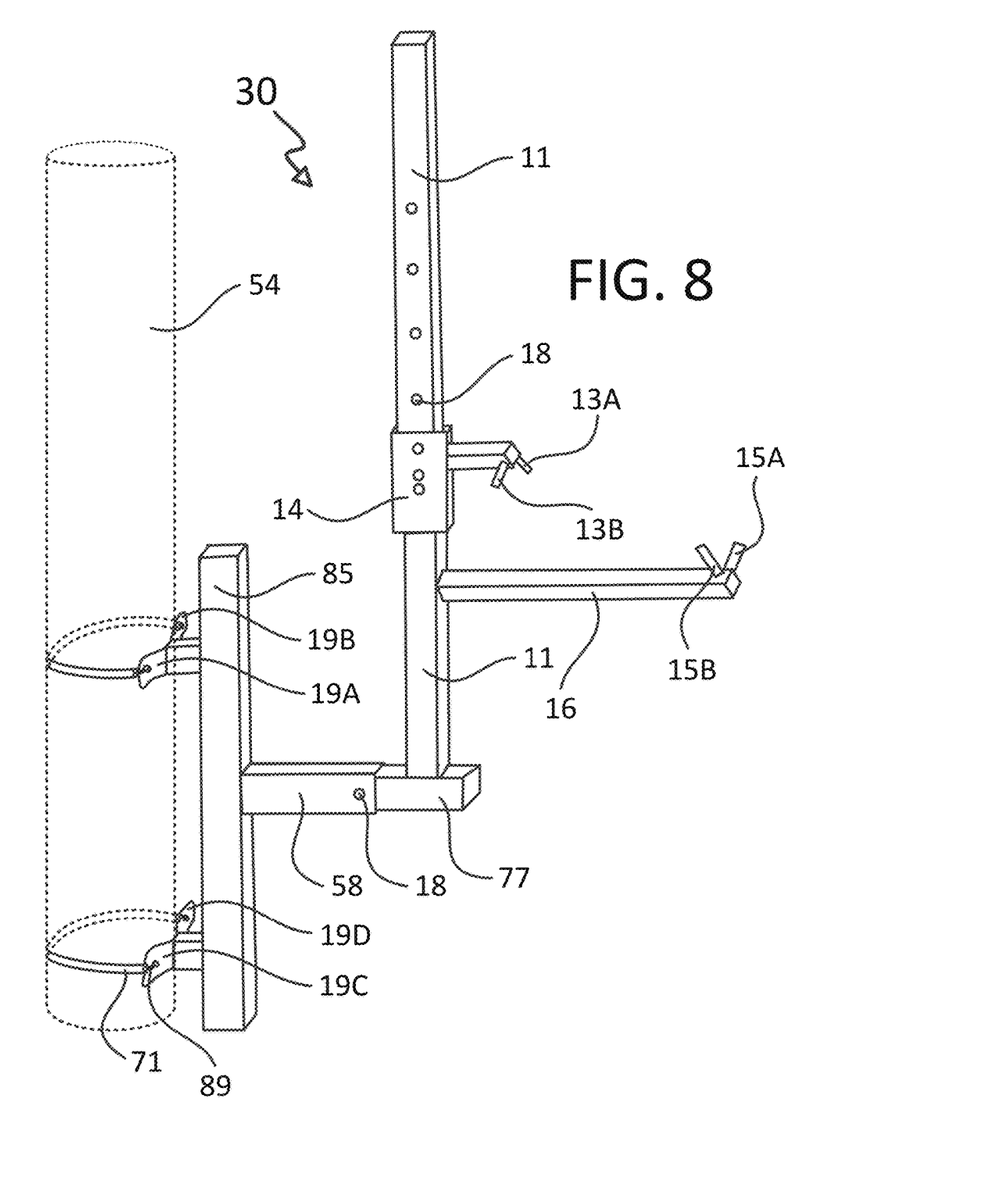
FIG. 8 depicts a perspective side view of a wood log holding device in a use configuration according to a third embodiment of the present invention.

Another embodiment 30 for attaching the device for holding a wood log to a tree is shown in FIG. 8. A tree attaching post 85 separate from the device of embodiment 10 is strapped to a lower portion of the tree 54 through two sets of tree attaching arms: 19A and 19B in the first set and 19C and 19D in the second set using straps 71. The tree attaching post 85 contains a holding sleeve 58 that is perpendicularly attached to the tree attaching post 85. The device of embodiment 10 has a base 77 attached to post 11 that is configured to fit inside the holding sleeve 58. The base may be held in place by using a pin, such as that shown by pin 55, inserted into hole 18 that goes through the holding sleeve 58 and base 77. The device for holding a wood log of embodiment 10 is mounted over base 77. With configuration 30, the device for holding a wood log is positioned at a higher elevation compared to that of embodiment 20 which may be more comfortable for wood cutting and make it easier to assemble and disassemble.

Figure 9:
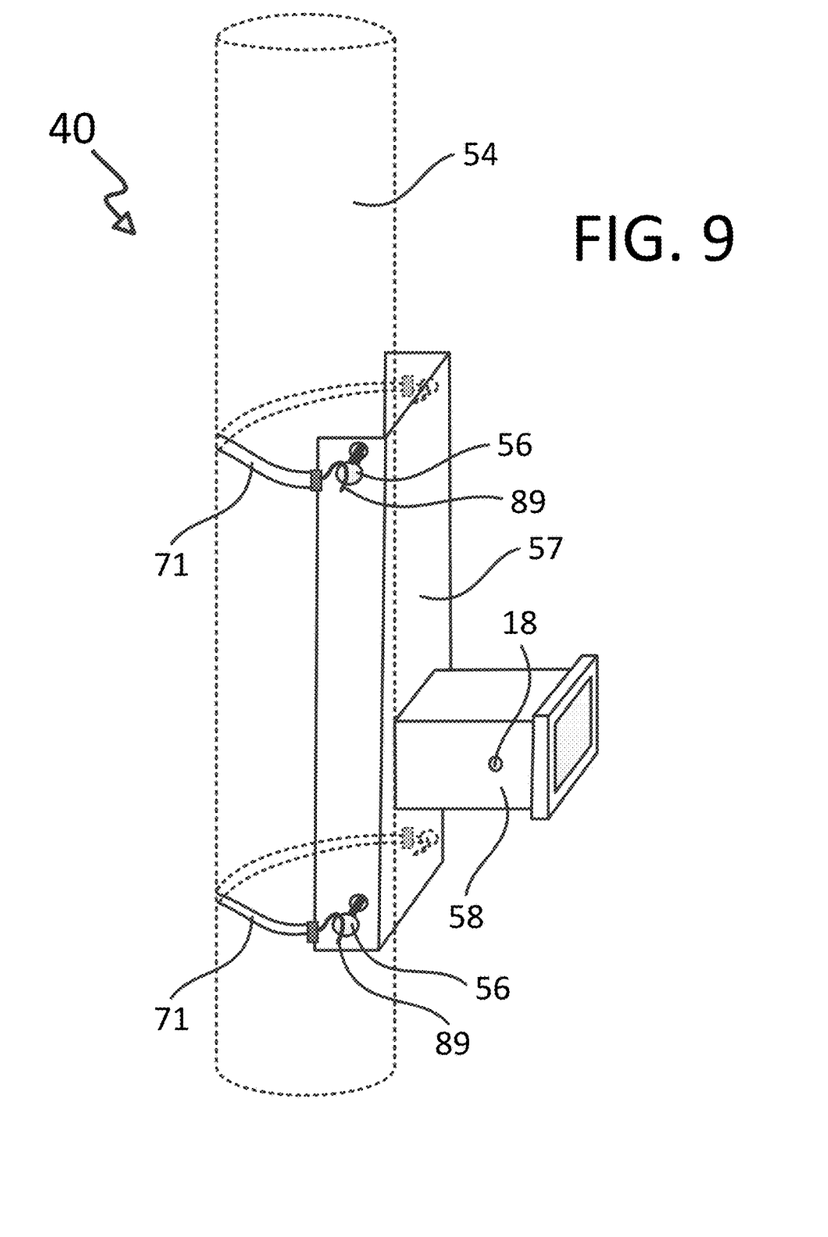
FIG. 9 depicts a side perspective view of an attaching component of the wood log holding device in a use configuration according to a fourth embodiment of the present invention.
Figure 10:
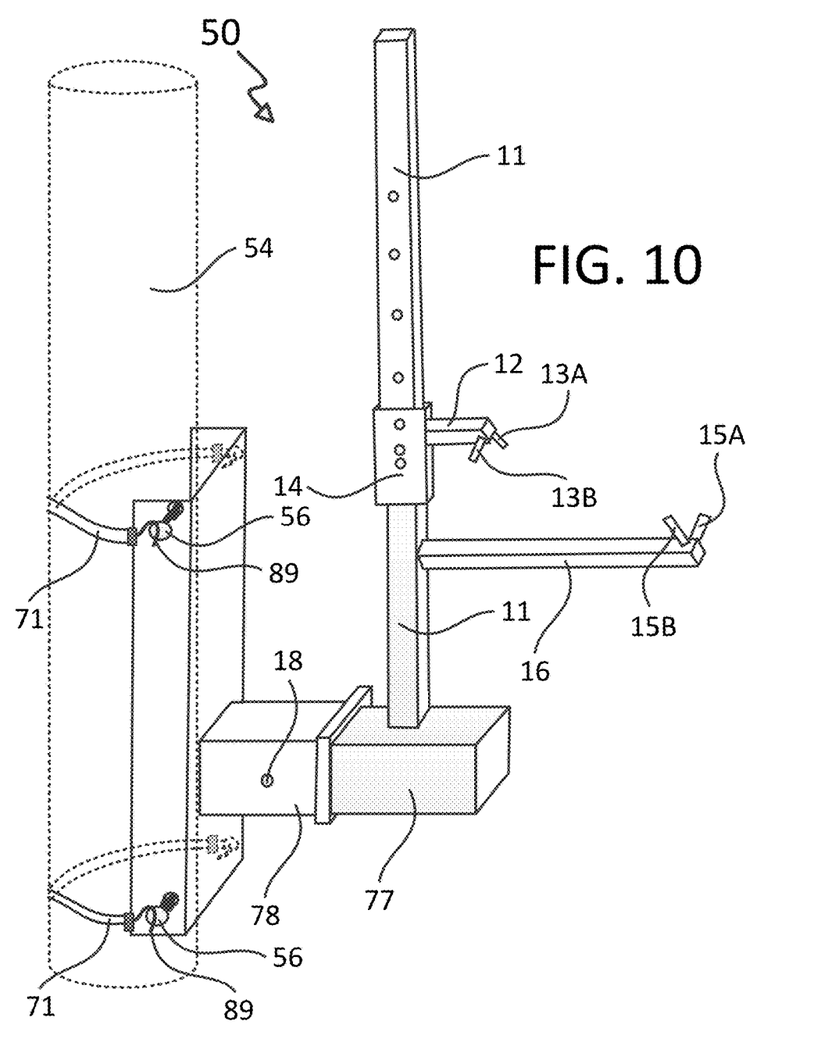
FIG. 10 shows a side perspective view of a wood log holding device in a use configuration according to a fifth embodiment of the present invention.

Another embodiment 40 for attaching the device for holding a wood log to a tree is shown in FIG. 9. A large tree attaching bracket 83 separate from the device of embodiment 10 is strapped to a lower portion of the tree 54 in two locations. The attachment is accomplished by strapping the bracket 83 to the tree with two straps 71; one at the top of bracket 83 and the other at the bottom of bracket 83. Each strap 71 has a hook attached to each end that hook onto an eyelet pin 56 inserted into holes disposed on the sides of the bracket 83. The bracket 83 contains a holding sleeve 58 perpendicularly attached to the bracket 83 for holding the base 77 of the device for holding a wood log as shown by embodiment 50 in FIG. 10. This is similar to the way embodiment 40 is configured.

Figure 11:
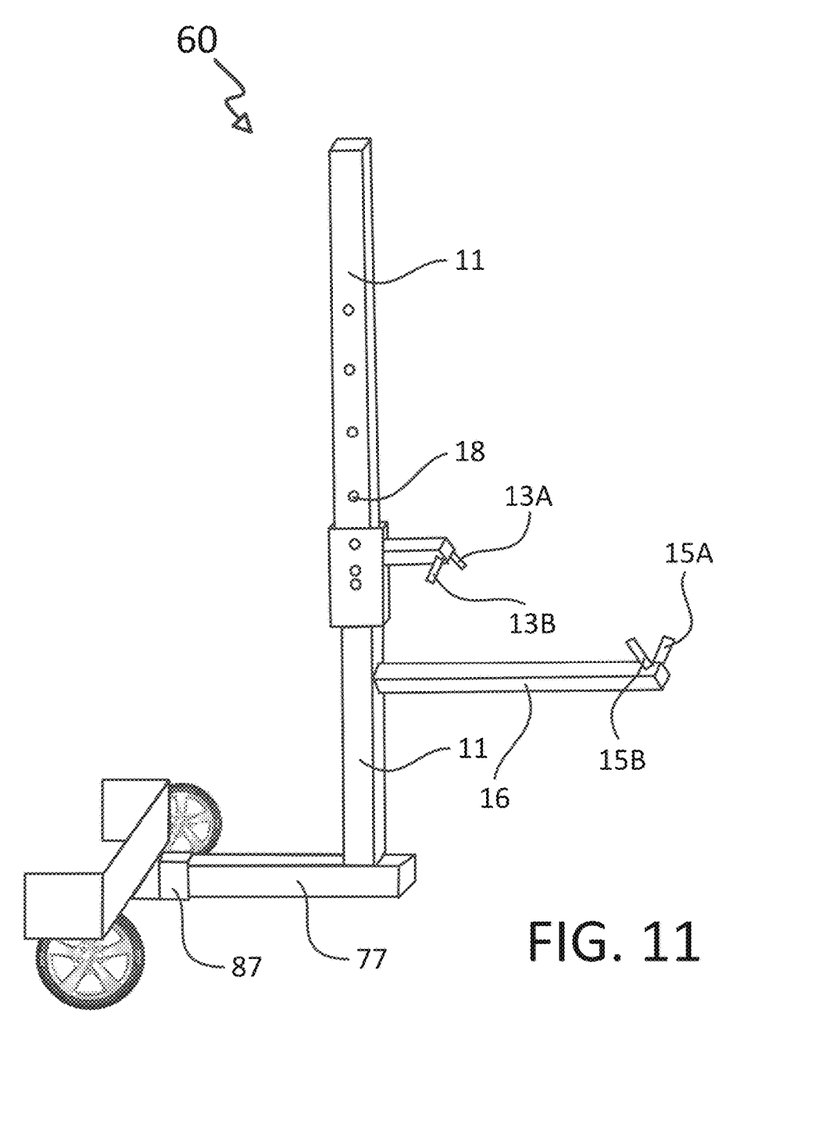
FIG. 11 shows a side perspective view of a wood log holding device in a use configuration according to a sixth embodiment of the present invention.
Figure 12:
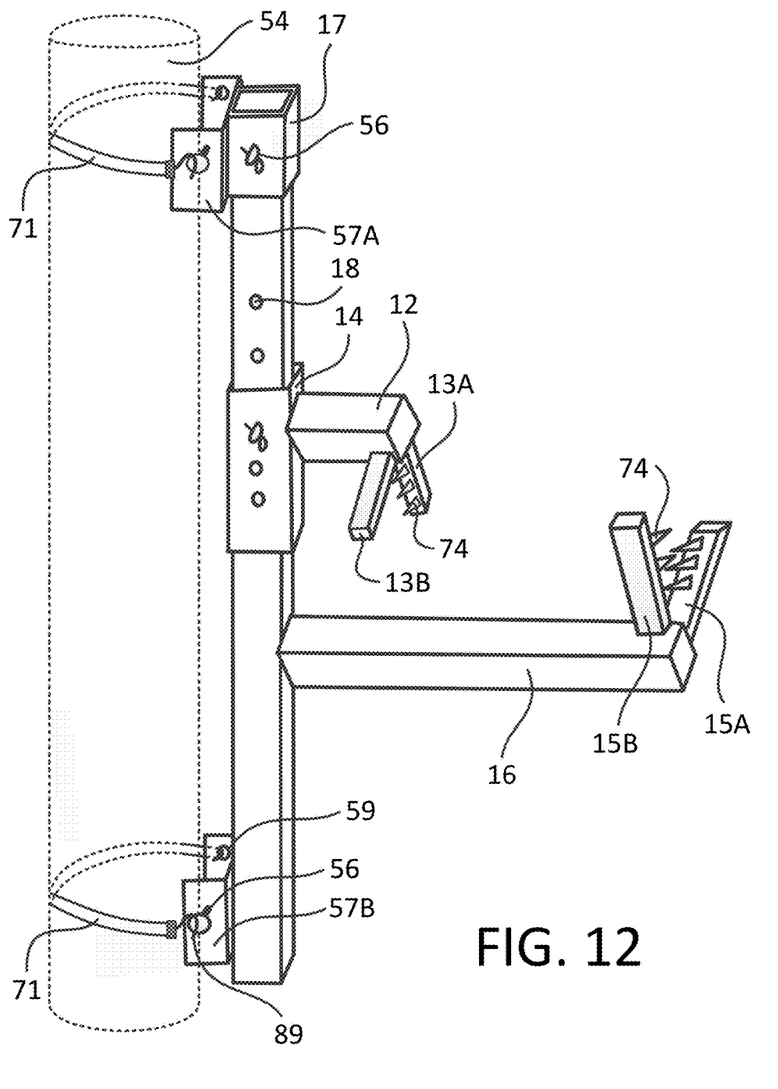
FIG. 12 shows a side perspective view of a wood log holding device in a use configuration according to a seventh embodiment of the present invention.

In embodiment 60, the base of the wood log holding device 77 is inserted into a hitch sleeve 87 of a car, truck or trailer as shown in FIG. 11.

In a typical use application, a logger would cut down a large tree, then when the tree trunk is on the ground, he or she would cut off sections ranging in length from 20-25 ft. and thickness from 8" to about 15"; subject to the ability of the logger to lift each section and to place it onto the support arms. With the lower support arms having a length of around 16", a 20 ft. log would stick out of the arms about another 18 ft. Then the user would use his or her chainsaw to cut off around 16" sections that would be used as firewood for example. It is noted that lower support arms longer than 16" configured to accommodate longer logs as well as extensions of the lower arm accomplished by means of a sleeve also fall within the scope of the present invention. It is also noted that the holding device is not limited for use to cut wood logs and may be used inter alia for cutting PVC as well as metal pipes.

It should be understood, of course, that the foregoing relates to exemplary embodiments of the invention and that modifications may be made without departing from the spirit and scope of the invention.

I claim:
1. A wood log holding device comprising:
a first vertical post configured to be disposed on a ground;
an upper support arm attached to the first vertical post; the upper support arm being adapted for upward and downward sliding, said upper support arm being positioned substantially perpendicular with the first vertical post;
a lower support arm attached to the first vertical post, the lower support arm being positioned below the upper support arm, the lower support arm being positioned substantially perpendicular with the first vertical post;
at least two downwardly disposed grip members attached to a rear side of the upper support arm;
at least two upwardly disposed grip members attached to a front side of the lower support arm; and
an elongated base attached to the first vertical post, said base being adapted for lateral sliding inside a fourth sleeve, said fourth sleeve being attached to a U-shaped bracket, said U-shaped bracket being configured to be fitted onto a standing tree;
a first strap and a second strap;
said U-shaped bracket configured to be fastened onto the standing tree by said first strap wrapping around the standing tree, said first strap hooking onto the lower portion of the U-shaped bracket, said U-shaped bracket configured to be fastened onto the standing tree by said second strap wrapping around the standing tree, said second strap hooking onto an upper portion of the U-shaped bracket, said elongated base configured to slide toward and away from the standing tree.

2. The wood log holding device of claim 1, wherein two downwardly disposed grip members substantially perpendicular to one another are attached to the rear side of the upper support arm.

3. The wood log holding device of claim 1, wherein two upwardly disposed grip members substantially perpendicular to one another are attached to the front side of said lower support arm.

4. The wood log holding device of claim 1, wherein the upper support arm is attached to a first sleeve adapted for upward and downward sliding on the first vertical post, said first sleeve being held in a fixed position on the first vertical post with a pin inserted into a hole in the first sleeve and corresponding hole in the first vertical post.

5. The wood log holding device of claim 1, wherein the first vertical post further contains standing tree attaching accessories.

6. The wood log holding device of claim 5, wherein the accessories comprise a set of two lower arms attached to a lower rear side of the first vertical post, the lower arms extending sideways from the first vertical post, the accessories also comprising a set of two upper arms attached to an upper rear side of said first vertical post, said upper arms extending sideways from the first vertical post.

7. The wood log holding device of claim 6, wherein the set of two upper arms is attached to a second sleeve adapted for upward and downward sliding on the first vertical post, the second sleeve being held in a predetermined position on the first vertical post with a pin inserted into a hole in the second sleeve and corresponding hole in the first vertical post.

8. The wood log holding device of claim 5, wherein the accessories comprise a lower bracket attached to a lower rear portion of the first vertical post, the accessories also comprising an upper bracket attached to an upper rear portion of the first vertical post.

9. The wood log holding device of claim 8, wherein the upper bracket is attached to a second sleeve adapted for upward and downward sliding on the first vertical post, the second sleeve being held in a predetermined position on the first vertical post with a pin inserted into a hole in the second sleeve and corresponding hole in the first vertical post.

10. The wood log holding device of claim 6, further comprising a first flexible strap wrapped around the standing tree, said first flexible strap being hooked onto a first arm of the lower arm set at one end and hooked onto a second arm of the lower arm set at another end and further comprising a second flexible strap hooked onto a first arm of the upper arm set at one end and hooked onto a second arm of the upper arm set at another end.

11. The wood log holding device of claim 8, further comprising a first flexible strap wrapped around the standing tree, said first flexible strap being hooked onto a first side of the lower bracket at one end and hooked onto a second side of the lower bracket at another end and further comprising a second flexible strap hooked onto a first side of the upper bracket at one end and hooked onto a second side of the upper bracket at another end.

12. The wood log holding device of claim 1, further comprising an elongated base attached to the first vertical post, said base being adapted for lateral sliding inside a third sleeve, said third sleeve being attached to a second vertical post, said second vertical post comprising a set of two lower arms attached to a lower rear side of the second vertical post, the lower arms extending sideways from the first vertical post, the second post also comprising a set of two upper arms attached to an upper rear side of said second vertical post, the upper arms extending sideways from the first vertical post, said second post attaching to a standing tree by a first strap wrapping around the standing tree, said first strap hooking onto the lower arms, and said second post attaching to the standing tree by a second strap wrapping around the standing tree, said second strap hooking onto the upper arms, said elongated base adapted to slide toward and away from the standing tree.

13. The wood log holding device of claim 1, further comprising the elongated base attached to the first vertical post, said elongated base being adapted for insertion into a hitch sleeve of a vehicle.

14. The wood log holding device of claim 1, further comprising a plurality of spikes that are attached to inner surfaces of said at least two downwardly disposed grip members.

15. The wood log holding device of claim 1, further comprising a plurality of spikes that are attached to inner surfaces of said at least two downwardly disposed grip members.

* * * * *